United States Patent [19]

Fleetman

[11] 3,766,473
[45] Oct. 16, 1973

[54] VISUAL INDICATOR FOR AN ELECTRICAL METER MOVEMENT
[75] Inventor: Hobart H. Fleetman, Lansdale, Pa.
[73] Assignee: Electro-Mechanical Instrument Co., Inc., Perkasie, Pa.
[22] Filed: Mar. 31, 1972
[21] Appl. No.: 239,913

[52] U.S. Cl.................. 324/96, 350/110, 350/112
[51] Int. Cl.. G01r 19/00, G02b 27/02, G02b 17/04
[58] Field of Search...................... 324/146, 96, 97; 350/110, 112; 116/114; 73/319; 240/2.1

[56] References Cited
UNITED STATES PATENTS
2,616,941  11/1952  Lasko .................................. 73/319
3,638,118  1/1972  Mackenzie.......................... 324/146

FOREIGN PATENTS OR APPLICATIONS
285,814   5/1931   Italy...................................... 324/97

Primary Examiner—Alfred E. Smith
Attorney—Richard E. Kurtz

[57]  ABSTRACT

A visual indicator includes a concave reflecting surface having an opening therein. An optical image-producing element moves into and out of the opening under the guidance of an electrical meter movement. The electrical meter movement responds to an electrical signal so that the image produced by the visual indicator is related to the magnitude of the electrical signal applied to the meter movement.

9 Claims, 13 Drawing Figures

PATENTED OCT 16 1973 3,766,473
SHEET 1 OF 2
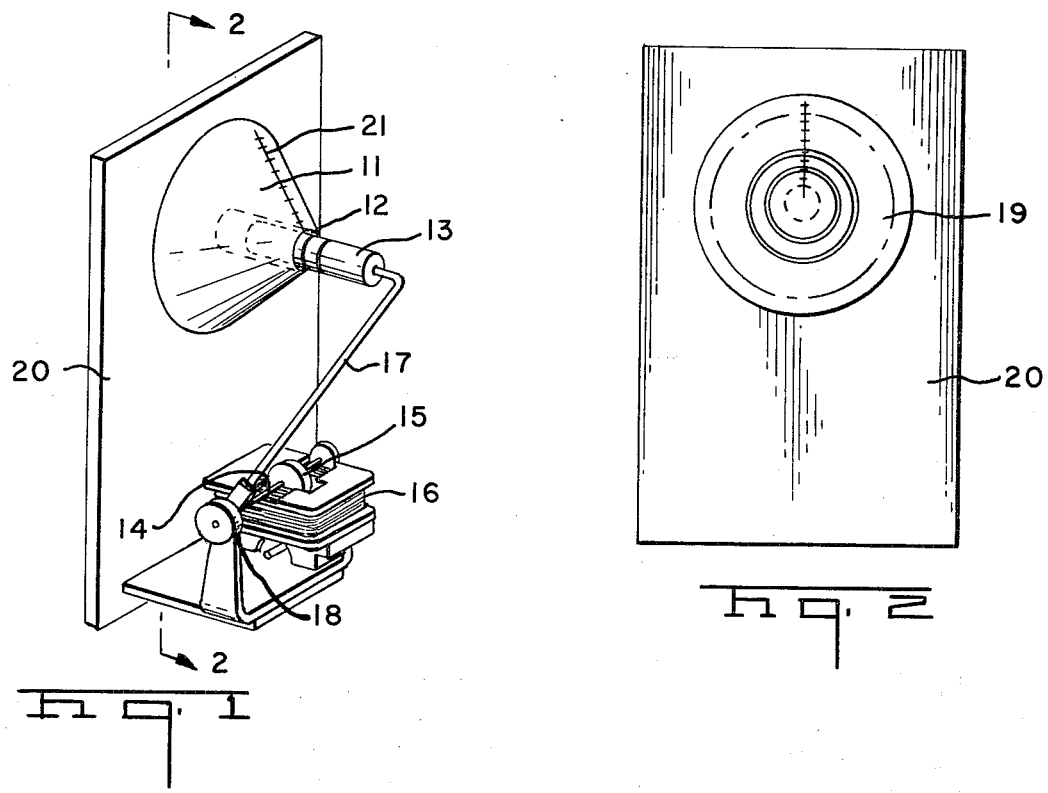
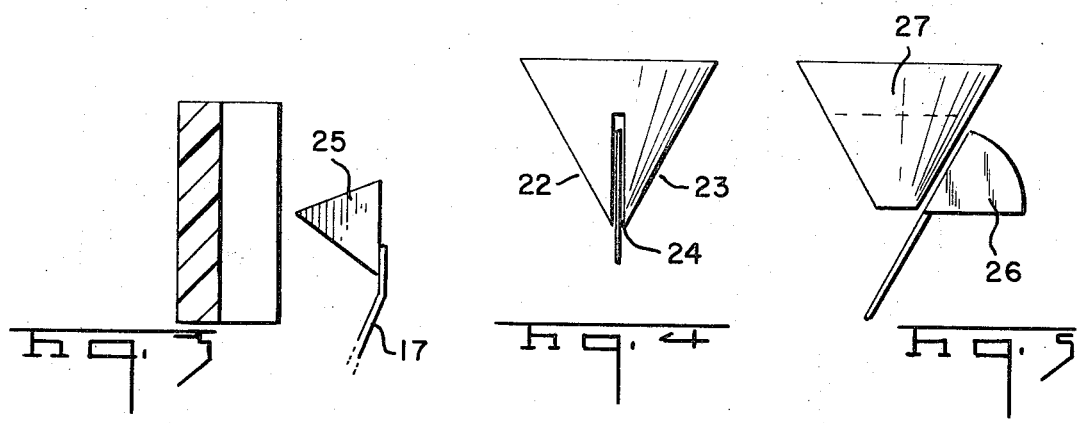

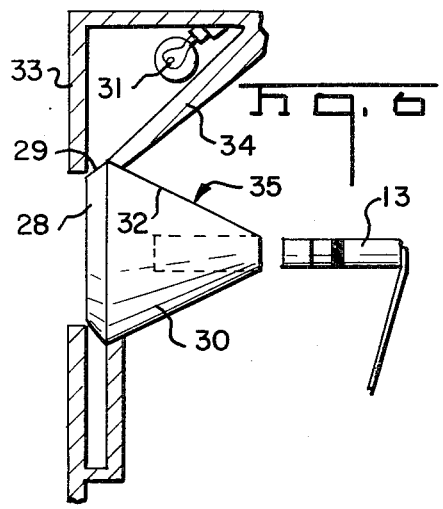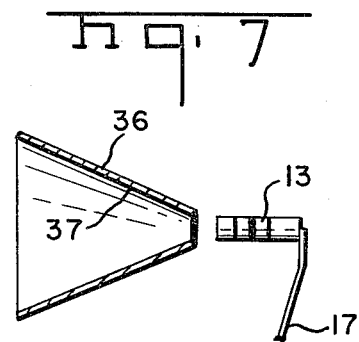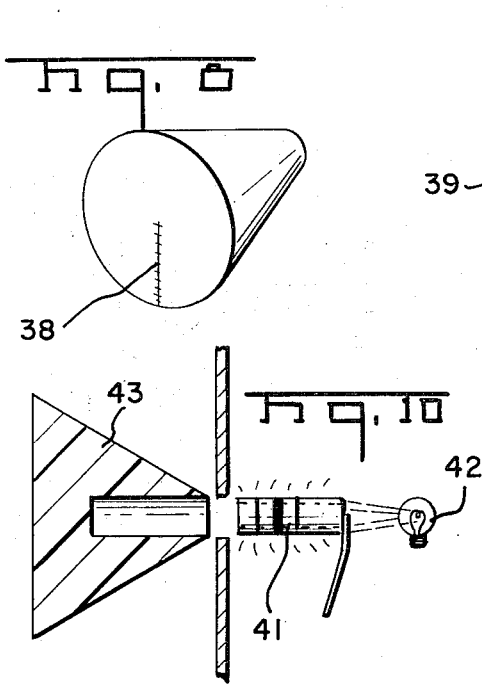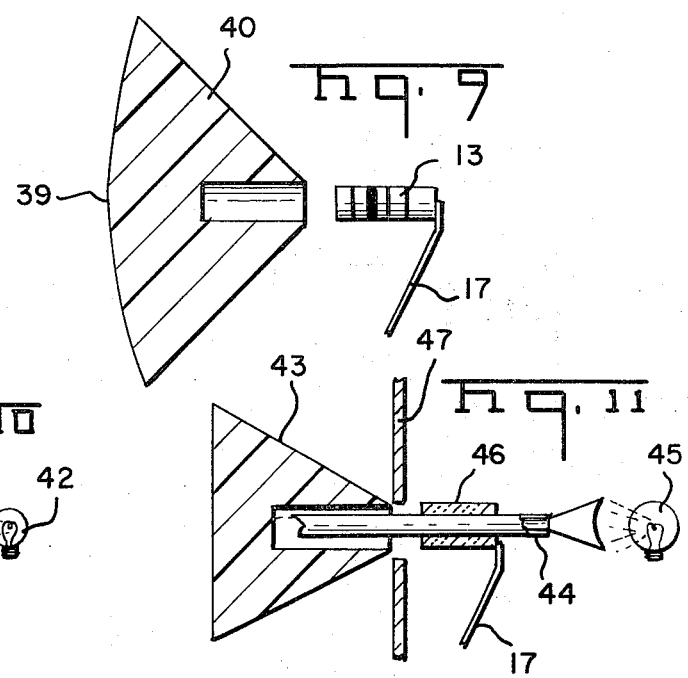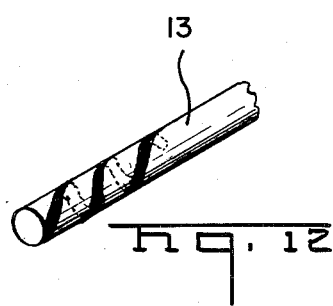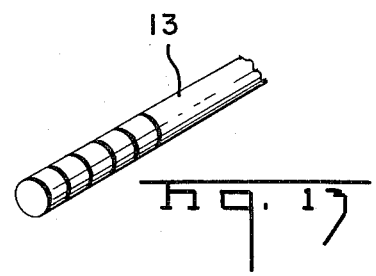

VISUAL INDICATOR FOR AN ELECTRICAL METER MOVEMENT

BACKGROUND OF THE INVENTION

This invention relates to visual indicators and more particularly to a visual indicator driven by an electrical meter movement.

Visual indicators having a distinctive display are known. For example, the Lasko U.S. Pat. No. 2,616,941 describes an indicator in which an elongated member moves into and out of a transparent member. This produces a varying visual image at one viewing surface of the transparent member. Similarly, the Bilbrey U.S. Pat. No. 3,181,496 describes a visual indicator in which an elongated member is moved relative to a reflecting surface to produce a visual indication.

The normal display for an electrical meter movement is by way of a pointer which moves relative to a scale. An example of a moving magnet meter is shown in U.S. Pat. No. 3,094,659 — Pfeffer.

SUMMARY OF THE INVENTION

In accordance with this invention a striking visual display is provided for an electrical meter. The electrical meter movement is connected to an optical image-producing element. This element is movable by the meter movement into and out of an opening in a concave reflecting surface. This produces a visual image which is related to the magnitude of the electrical signal applied to the meter movement.

In accordance with an important aspect of this invention the image-producing element has no frictional contact with any stationary part of the indicator. The image-producing element is guided into and out of the opening in the reflecting surface solely by the meter movement. This frictionless arrangement makes possible the use of a sensitive electrical meter movement while still producing an accurately repeatable reading.

In accordance with another important aspect of this invention the concave reflective surface is formed by one outer surface of a transparent member. The visual image is formed inside of the transparent member and the visual image is observable through a different outer surface of the member.

In accordance with another aspect of this invention the visual indicator has a transparent element having a chamfer around at least a portion of the periphery. The transparent element has a chamfered surface with a chamfer angle which directs light from an external source through the chamfered surface and toward the image-producing element. A shield blocks light from the external source from the viewing surface of the visual indicator.

In accordance with a further aspect of the invention the chamfered surface and the reflecting surface are surfaces of a transparent member. The visual image is formed inside of the transparent member and a shield blocks light from the external source from entering the transparent member through any surface other than the chamfered surface.

In accordance with a further aspect of this invention the size of the opening in the transparent member relative to the size of the image-producing element is large enough to allow travel of the image-producing element in an arcuate path and small enough to produce a substantially symmetrical visual image throughout the complete path of travel of the element through the opening. The center of the arcuate path is disposed relative to the opening so that there is a minimum displacement of the axis of the image-producing element relative to the axis of the opening.

In accordance with another aspect of this invention the surface through which the image is viewed is in the form of a lens which magnifies or reduces the visual image.

In accordance with another aspect of this invention the image-producing element is substantially flat. The reflecting surface forms two intersecting planes. The opening through which the image-producing element moves is along the intersection between the two intersecting planes.

In accordance with another aspect of this invention the reflecting surface is formed from a thin opaque member in the form of a hollow cone having a reflective inner surface.

In accordance with further aspects of this invention the image-producing element is a rod or a hollow walled tube. Image-producing elements in the form of an elongated member have patterns thereon which produce a variable image as the elongated member is moved into and out of the opening. These patterns include stripes, a helix, rings, and in general, brightly colored patterns which produce the striking visual image.

In accordance with another important aspect of this invention a scale is disposed relative to the image produced to indicate the relative magnitude of the electrical signal.

In accordance with another aspect of this invention the transparent member is conical in shape and the angles of the cone are such that a limited amount of light is refracted from the outside of the cone to the inside surface where the image is formed. In this manner an interesting backlighted image is formed.

The foregoing and other objects, features, and advantages of the invention will be better understood from the following more detailed description and appended claims.

DESCRIPTION OF THE DRAWINGS

FIG. 1 is a perspective view of the back of the meter movement and visual indicator;

FIG. 2 shows the front of the visual indicator;

FIG. 3 shows a perspective view of a modification wherein the reflecting surface forms two intersecting planes;

FIG. 4 shows a top view of the modification of FIG. 3;

FIG. 5 shows a modification similar to that of FIGS. 3 and 4 but in which the image-producing element enters the transparent member from the side;

FIG. 6 shows a modification in which the viewing surface is chamfered to direct light from an external source toward the image-producing element;

FIG. 7 shows a modification in which the reflecting surface is a thin opaque member in the form of a hollow cone having a reflective inner surface;

FIG. 8 shows a modification with the scale on the surface through which the image is viewed;

FIG. 9 shows a visual indicator in which the image viewing surface forms a lens;

FIG. 10 shows an indicator in which the image-producing element transmits light from an external source;

FIG. 11 shows a modification in which a light pipe conveys light into the transparent member;

FIG. 12 shows an elongated image-producing element which produces a spiral visual image; and FIG. 13 shows an image-producing element which produces a series of concentric rings as the visual image.

DESCRIPTION OF A PARTICULAR EMBODIMENT

In FIG. 1, one surface of a transparent member 11 forms a concave reflecting surface. An opening 12 extends into the transparent member 11. An optical image-producing element 13 moves into and out of the opening. An electrical meter movement includes an arbor 14, and a permanent magnet 15 mounted on the arbor. An electric coil 16 is magnetically coupled to the permanent magnet 15 to rotate the permanent magnet when an electrical signal is applied to the coil. A staff 17 is mounted on the arbor. The image-producing element 13 is mounted on the other end of the staff so that the image-producing element is moved into and out of the opening as the permanent magnet rotates the arbor. A control magnet 18 interacts with the permanent magnet 15 to apply a restoring torque to the arbor. As is well known, a hair-spring can alternately be used to apply restoring torque.

It is important that the size of the opening 12 relative to the size of the image-producing element 13 be large enough to allow travel of the image-producing element 13 in an arcuate path. However, the size of the opening must still be small enough to produce a substantially symmetrical visual image throughout the complete path of travel of the element through the opening.

It is also important that the image-producing element 13 has no frictional contact with any stationary part. The path of movement of the image-producing element 13 is guided solely by the meter movement. This is an important distinction over the indicators such as those shown in the aforementioned Lasko and Bilbrey patents. It allows the visual indicator to be used with a sensitive meter movement.

FIG. 2 shows the surface 19 through which the image is viewed. The indicator is mounted in a front panel 20.

The transparent member 11 is constructed of a transparent plastic material such as plexiglas. The refractive properties of the transparent material and the angle of the reflecting surface combine to provide a light-reflecting surace inside of the transparent member 11. Generally, it is desirable that only reflected light be observed through the viewing surface 19. However, in some instances the angles of the cone can be chosen such that a limited amount of light is refracted from outside of the cone to the inside surface where the image is formed. This forms an interesting backlighted image. The transparent member 11 may be coated to provide an opaque mirrored surface.

In the embodiment shown in FIG. 1, a scale 21 is placed on the outer surface of the cone. When viewed through the viewing surface 19 the scale is disposed relative to the image produced to indicate the relative magnitude of the electrical signal.

In the modification shown in FIGS. 3 and 4, the concave reflecting surface forms two intersecting planes 22 and 23. The opening 24 is along the intersection between the two intersecting planes. The image-producing element 25 is substantially flat. In the form shown, it is a flat triangular flag. Such a device produces a diamond-shaped image with the diamond expanding and contracting as the flag is moved into and out of the opening.

FIG. 5 shows a modification of FIGS. 3 and 4 in which the flat image-producing element 26 enters the opening in the transparent member 27 through an opening in the side of the member.

In FIG. 6, the image is viewed through a viewing surface 28 having a chamfer 29 around the periphery thereof. In the embodiment shown the chamfered surface forms one part of a transparent member 30. The chamfered surface has a chamfer angle which directs lights from an external source 31 through the chamfered surface toward the image-producing element 13 when it moves into the opening. A shield 33 blocks light from the external source 31 from impinging upon the viewing surface of the visual indicator. In the embodiment of FIG. 6 wherein a solid transparent viewing member 30 is provided, an additional portion of the shield 34 blocks light from entering the transparent member 30 through surface 35. For example, light from the source 31 is blocked from entering the transparent member in the direction of the arrow 35.

In FIG. 7, the reflecting surface is a thin opaque member 36. The member 36 is in the form of a hollow cone having a reflective inner surface 37. As an example, the member 36 may be molded from plastic, may be developed from sheet metal, or it may be stamped, drawn, or extruded from thin metal.

FIG. 8 shows the scale 38 disposed on the front viewing surface of the visual indicator.

In FIG. 9, the front viewing surface 39 of the transparent member 40 is in the form of a lens which magnifies the visual image. Alternatively, the surface could be in the form of a lens which produces the visual image.

In FIG. 10, the image producing element 41 is formed of a transparent light-conducting material. Light from the external source 42 is conveyed through the image-producing element into the transparent member 43. The elongate image-producing element has a light diverting portion which is inserted into the opening. The light diverting can be accomplished by frosting grooves in the element, or by a pattern printed or painted on the element. FIG. 10 shows such a pattern.

An alternative to this arrangement is shown in FIG. 11. As shown here, a stationary light pipe 44 conducts light from the source 45 into the inside of the transparent member 43. The image-producing element 46 has a hole through which the light pipe extends. The image-producing element 46 is moved over the light pipe 44 into the opening in the transparent member 43. A shield 47 prevents light from being conveyed from the source 45 to the outer surface of the transparent member 43.

FIG. 12 shows an elongated image-producing element having a pattern thereon which produces a spiral image as it is moved into and out of the opening.

FIG. 13 shows an elongate image-viewing element having rings thereon which produce a series of concentric rings as the element is moved into and out of the opening. The elongated image-producing elements may be a hollow walled tube or a rod.

In accordance with an important aspect of this invention, it has been found that the angle of the concave reflecting surface and the diameter of the image-producing element are critical in determining the angle in which the image can be viewed without distortion. It has been found acceptable if the image can be viewed without distortion within a 30° angle from the centerline of the concave surface. For example, distortion free viewing within a 30° angle from the centerline of conical member 40 in FIG. 9 is acceptable. As an example, the image was observed at a distance of 14 inches from the viewing surface 39 of a 90° cone such as that shown in FIG. 9. The image-producing element 10 was inserted 3/8 inch into the cone. With an image-producing element 13 having a diameter of 0.100 inch the image was observed without distortion only through an angle of 5° from the centerline. However, with an image-producing element having a diameter of 0.160 inch, the image was observable without distortion within an angle of 15° from the centerline. Simple tests such as this will quickly determine the required relationship between the angle of the concave reflecting surface with respect to its centerline and the diameter of the image-producing element required for distortion free viewing of the image within an angle of 30° from the centerline.

While ordinarily the visual indicator will be used to indicate the continuous changes in the magnitude of the electrical signal, the indicator can also be used to indicate abrupt changes in the magnitude of the electrical signal. For example, it could be used to indicate an on or an off condition.

While particular embodiments of the invention have been shown and described, other modifications will be apparent. The appended claims are, therefore, intended to cover all such modifications within the true spirit and scope of the invention.

What is claimed is:

1. A visual indicator comprising:
   a concave reflecting surface having an opening therein,
   an optical image-producing element movable into and out of said opening, the size of said opening relative to the size of said image-producing element being large enough to allow travel of said image-producing element in an arcuate path and small enough to produce a substantially symmetrical visual image throughout the complete path of travel of said element through said opening, and
   an electrical meter movement connected to said element to move said element into and out of said opening in response to an electrical signal applied to said movement so that the image produced by the visual indicator is related to the magnitude of the electrical signal applied to said meter movement, said electrical meter movement including:
   an arbor,
   a permanent magnet mounted on said arbor,
   an electric coil magnetically coupled to said permanent magnet to rotate said permanent magnet when an electrical signal is applied to said coil,
   a staff mounted on said arbor, said image-producing element being mounted on said staff so that said image-producing element is moved into and out of said opening as said permanent magnet rotates said arbor, and
   means for applying a restoring torque to said arbor.

2. The visual indicator recited in claim 1 wherein the angle of said concave reflecting surface with respect to its centerline the depth of insertion of said image-producing element, and the diameter of said image-producing element are such that said image can be viewed without distortion within an angle of approximately thirty degrees from said centerline.

3. The visual indicator recited in claim 1 wherein said concave reflecting surface is formed by one outer surface of a transparent member, wherein the visual image is formed inside of said transparent member, and wherein said visual image is observable through a different outer surface of said member.

4. The visual indicator recited in claim 2 wherein said transparent member is a transparent plastic material and wherein the refractive properties and the angle of the reflecting surface are combined to provide a light reflecting surface.

5. The visual indicator recited in claim 1 further comprising a scale disposed relative to the image produced to indicate the relative magnitude of said electrical signal.

6. The visual indicator recited in claim 1 wherein said image-producing element has no frictional contact with any stationary part, said image-producing element being guided solely by said meter movement.

7. The visual indicator recited in claim 1 wherein said image-producing element is a rod.

8. The indicator recited in claim 1 wherein said image-producing element is a hollow walled tube.

9. The indicator recited in claim 1 wherein said image-producing element is an elongated member having a pattern thereon which produces a variable image as said elongated member is moved into and out of said opening.

* * * * *

PO-1050
(5/69)

UNITED STATES PATENT OFFICE
CERTIFICATE OF CORRECTION

Patent No. 3,766,473              Dated  October 16, 1973

Inventor(s) HOBART H. FLEETMAN

It is certified that error appears in the above-identified patent and that said Letters Patent are hereby corrected as shown below:

Column 4, line 35, "produces" should be --reduces--.

Signed and sealed this 23rd day of April 1974.

(SEAL)
Attest:

EDWARD M. FLETCHER, JR.                C. MARSHALL DANN
Attesting Officer                      Commissioner of Patents